(12) United States Patent
Hayasaka et al.

(10) Patent No.: US 7,216,634 B2
(45) Date of Patent: May 15, 2007

(54) DIESEL ENGINE DME FUEL SUPPLY DEVICE

(75) Inventors: Yukihiro Hayasaka, Higashi-Matsuyama (JP); Shinya Nozaki, Higashi-Matsuyama (JP); Toshifumi Noda, Higashi-Matsuyama (JP); Daijo Ushiyama, Higashi-Matsuyama (JP); Hiroshi Oikawa, Higashi-Matsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 131 days.

(21) Appl. No.: 10/520,829

(22) PCT Filed: Jul. 9, 2003

(86) PCT No.: PCT/JP03/08725

§ 371 (c)(1),
(2), (4) Date: Jan. 6, 2005

(87) PCT Pub. No.: WO2004/005696

PCT Pub. Date: Jan. 15, 2004

(65) Prior Publication Data

US 2005/0235948 A1    Oct. 27, 2005

(30) Foreign Application Priority Data

Jul. 9, 2002    (JP) ............................ 2002-199407
Aug. 5, 2002   (JP) ............................ 2002-227493

(51) Int. Cl.
*F02M 37/00* (2006.01)

(52) U.S. Cl. .................................................... 123/514
(58) Field of Classification Search ............... 123/514, 123/516, 446
See application file for complete search history.

(56) References Cited

U.S. PATENT DOCUMENTS

| | | | | |
|---|---|---|---|---|
| 5,485,818 | A * | 1/1996 | McCandless | 123/294 |
| 6,484,490 | B1 * | 11/2002 | Olsen et al. | 60/39.281 |
| 6,805,105 | B2 * | 10/2004 | Kato et al. | 123/514 |
| 6,955,156 | B2 * | 10/2005 | Noda et al. | 123/364 |
| 2006/0090738 | A1 * | 5/2006 | Hoffmann et al. | 123/573 |

* cited by examiner

*Primary Examiner*—Thomas Moulis
(74) *Attorney, Agent, or Firm*—Priest & Goldstein PLLC

(57) ABSTRACT

A bypass controller (30) controls ON/OFF of a three-way electromagnetic valve (62) according to a detection value of a cam chamber sensor (12a). When the cam chamber sensor (12a) detects a viscosity of lubricant exceeding a predetermined allowable value, the three-way electromagnetic valve (62) is controlled to turn ON so that the output side of an oil separator (13) communicates with a bypass route (61). The pressure in the cam chamber (12) is reduced to or below the atmospheric pressure by suction of a compressor (16) with a check valve (14) regulating the pressure in the cam chamber (12) to the atmospheric pressure or above in the bypassed state. When the detection value of the viscosity of the lubricant output by the cam chamber sensor (12a) has become the predetermined allowable value or below, the three-way electromagnetic valve (62) is controlled to turn OFF so that the output side of the oil separator (13) communicates with the check valve (14) and the bypass route (61) is cut off.

17 Claims, 6 Drawing Sheets

DIESEL ENGINE DME FUEL SUPPLY DEVICE

TECHNICAL FIELD

This invention relates to a DME fuel supply device for a diesel engine which uses DME (dimethyl ether) as fuel.

BACKGROUND ART

A diesel engine which uses clean-burning DME (dimethyl ether), instead of light oil, as fuel is now attracting attention as means for reducing air pollution by diesel engines. DME fuel is a liquefied gas fuel unlike light oil as a conventional fuel. That is, DME fuel has a boiling point lower than that of light oil and vaporizes at room temperature, whereas light oil exists as a liquid at atmospheric pressure and temperature. Thus, in the case that DME fuel is used in a conventional diesel engine, the DME fuel vaporizes when the supply pressure to an injection pump is low. Thus, to supply liquid DME fuel to an injection pump, the supply pressure to the injection pump must be higher than that required to deliver light oil to the injection pump.

Thus, when DME fuel is used in a conventional diesel engine, the amount of fuel leaking through a gap between a plunger barrel and a plunger of an injection pump for delivering the DME fuel to a fuel injection nozzle of the engine into a cam chamber of the injection pump is greater than the amount of fuel leaking when light oil fuel is used due to the high supply pressure to the injection pump. In addition, DME has a lower viscosity than that of light oil and thus easily leaks through the gap, which increases the amount of fuel leaking through the gap. When DME fuel in a liquid state leaked through the gap between the plunger barrel and the plunger flows into the cam chamber of the injection pump and is mixed with lubricating oil in the cam chamber, the viscosity of the lubricating oil is reduced, which causes a possibility of a malfunction of the injection pump. It is difficult to separate and remove the DME fuel in a liquid state mixed with lubricating oil from the lubricating oil, and also it takes a long time for the DME fuel to vaporize and be removed from the lubricating oil. There arises a need for the injection pump of the DME fuel supply device for a diesel engine to minimize the amount of DME fuel in a liquid state leaking through the gap between the plunger barrel and the plunger into the cam chamber.

Even if the plunger barrel and the plunger are formed with high accuracy to minimize the gap there between, however, there is a limit to reducing DME fuel leaks. Thus, an example of means for solving the problem is a DME fuel supply device for a diesel engine adapted to separate lubricating oil from vaporized DME fuel, a vapor phase part, in the cam chamber with an oil separator, pump the separated DME fuel in a vapor state, and returns it to a fuel tank. This accelerates vaporization of DME fuel in a liquid state leaked into the cam chamber so that the amount of DME fuel in a liquid state to be mixed with lubricating oil can be reduced, and also accelerates vaporization of DME fuel in a liquid state mixed with lubricating oil. Therefore, the time required for DME fuel in a liquid state to be separated from lubricating oil can be reduced. This prevents reduced lubricating performance of lubricating oil caused by DME fuel mixed with the lubricating oil.

Meanwhile, the cam chamber is held at a constant pressure which is atmospheric pressure or above by a pressure regulating valve or the like, since the entry of oxygen into the cam chamber must be prevented. Thus, smooth vaporization of DME fuel is prevented, and even if DME fuel separated by the oil separator described above is pumped and returned to the fuel tank, not all the DME fuel leaked into the cam chamber is returned, so that the amount of DME fuel mixed with lubricating oil in the cam chamber is gradually increased. This accelerates deterioration of lubricating oil in the cam chamber, resulting in reduced lubricating performance of lubricating oil in a short period of time, and lubricating oil in the cam chamber needs to be replaced at short intervals.

DISCLOSURE OF THE INVENTION

In view of the foregoing, it is, therefore, an object of this invention to prevent reduced lubricating performance of lubricating oil caused by DME fuel leaked into the cam chamber of the injection pump.

In order to achieve the foregoing object, the invention in a first aspect is a DME fuel supply device for a diesel engine, comprising: an injection pump for delivering DME fuel supplied from a fuel tank via a feed pipe in a specified amount to an injection pipe in communication with a fuel injection nozzle of a diesel engine at specified timing; an oil separator for separating DME fuel mixed with lubricating oil in a cam chamber of the injection pump from the lubricating oil; a communication passage adapted to retrieve DME fuel separated by the oil separator to the fuel tank; suction means disposed in the communication passage for pumping a vapor phase part in the cam chamber via the oil separator; cam chamber pressure regulating means disposed between the suction means disposed in the communication passage and the oil separator for maintaining the pressure in the cam chamber at a specified pressure or above; a bypass passage routed around the cam chamber pressure regulating means and directly communicating the cam chamber and the suction means; and bypass passage opening means for opening the bypass passage.

As described above, the cam chamber of the injection pump is held at a constant pressure which is atmospheric pressure or above by the cam chamber pressure regulating means, since the entry of oxygen into the cam chamber must be prevented. Thus, smooth vaporization of DME fuel is prevented by the pressure, and even if DME fuel separated by the oil separator is pumped and returned to the fuel tank by the suction means, not all the DME fuel leaked into the cam chamber is returned, so that the amount of DME fuel mixed with lubricating oil in the cam chamber is gradually increased.

Therefore, there are provided the communication passage routed around the cam chamber pressure regulating means for maintaining the pressure in the cam chamber at a specified pressure which is atmospheric pressure or above and directly communicating the cam chamber and the suction means, and the bypass passage opening means for opening the communication passage. The cam chamber is pumped by the suction means with the cam chamber pressure regulating means bypassed as necessary so that the pressure in the cam chamber is temporarily reduced to negative pressure, or below atmospheric pressure. This highly accelerates vaporization of DME fuel mixed with lubricating oil, so that it can be retrieved to the fuel tank in a short time.

According to the invention of the present application in the first aspect, bypassing the cam chamber pressure regulating means as necessary highly accelerates vaporization of DME fuel mixed with lubricating oil, so that it can be retrieved to the fuel tank in a short time. This provides the function and effect that reduced lubricating performance of lubricating oil caused by DME fuel leaked into the cam chamber of the injection pump can be prevented.

The invention in a second aspect is the DME fuel supply device for a diesel engine in the first aspect, further comprising: cam chamber state detecting means for detecting at least one of the viscosity of lubricating oil in the cam chamber, the concentration of lubricating oil in the cam chamber, the pressure in the cam chamber, and the temperature in the cam chamber; and bypass controlling means for controlling the bypass passage opening means to be ON when the detection value detected by the cam chamber state detecting means exceeds a predetermined allowable value.

The cam chamber state detecting means for detecting at least one of the viscosity of lubricating oil in the cam chamber, the concentration of lubricating oil in the cam chamber, the pressure in the cam chamber, and the temperature in the cam chamber, can detect deterioration of lubricating oil in the cam chamber, namely, reduced lubricating performance of lubricating oil caused by DME fuel in a specified amount or more mixed with the lubricating oil. When the detection value detected by the cam chamber state detecting means exceeds a predetermined allowable value, the bypass passage opening means is controlled to be ON. This allows appropriate control of bypassing the cam chamber pressure regulating means. Reduced lubricating performance of lubricating oil caused by DME fuel in a specified amount or more mixed with the lubricating oil can be detected with higher accuracy by detecting at least two of the viscosity of lubricating oil in the cam chamber, the concentration of lubricating oil in the cam chamber, the pressure in the cam chamber, and the temperature in the cam chamber and combining the detected information to determine the level of deterioration of the lubricating oil from plural aspects.

According to the invention in the second aspect, the cam chamber state detecting means for detecting at least one of the viscosity of lubricating oil in the cam chamber, the concentration of lubricating oil in the cam chamber, the pressure in the cam chamber, and the temperature in the cam chamber, allows appropriate control of bypassing the cam chamber pressure regulating means. This provides the function and effect which is provided by the invention in the first aspect.

The invention in a third aspect is the DME fuel supply device for a diesel engine in the second aspect, in which the bypass controlling means controls the bypass passage opening means to be OFF when the detection value detected by the cam chamber state detecting means achieves a predetermined allowable value or below.

According to the invention in the third aspect, the bypass passage opening means, which is controlled to be ON when the detection value detected by the cam chamber state detecting means exceeds a predetermined allowable value, is controlled to be OFF when the detection value detected by the cam chamber state detecting means achieves a predetermined allowable value or below. This provides the function and effect, in addition to the function and effect which is provided by the invention in the second aspect, that the amount of DME fuel mixed with lubricating oil can be constantly held at a specified amount or less. This also allows the period of time when the cam chamber pressure regulating means is bypassed to be minimized, thereby providing the function and effect of minimizing the possibility of oxygen entering the cam chamber which is caused by the cam chamber pressure regulating means being bypassed.

The invention in a fourth aspect is the DME fuel supply device for a diesel engine in the second or third aspect, in which the bypass controlling means controls the bypass passage opening means to be OFF when the detection value detected by the cam chamber state detecting means exceeds a predetermined allowable value and then a specified period of time elapses.

Controlling the bypass passage opening means to be ON when the detection value detected by the cam chamber state detecting means exceeds a predetermined allowable value and then controlling it to be OFF when a specified period of time elapses, allows controlling the bypass passage opening means to be OFF in a simplified manner. The specified period of time is a prescribed value which is sufficiently long enough for the detection value detected by the cam chamber state detecting means to achieve a predetermined allowable value or below and is determined by experiment or the like.

According to the invention in the fourth aspect, the function and effect, in addition to the function and effect which is provided by the invention in the second or third aspect, is provided that the bypass passage opening means can be appropriately controlled to be OFF in a simplified manner after the detection value detected by the cam chamber state detecting means exceeds a predetermined allowable value and the bypass passage opening means is controlled to be ON.

The invention in a fifth aspect is the DME fuel supply device for a diesel engine in the first or second aspect, further comprising regular intervals bypass controlling means for controlling the bypass passage opening means to be ON and OFF for a specified period of time at predetermined intervals.

Controlling the bypass passage opening means to be ON and OFF for a specified period of time at regular intervals allows controlling the bypass passage opening means to be ON and OFF in a simplified manner. The time intervals at which the bypass passage opening means is controlled are made long enough for the amount of DME fuel mixed with lubricating oil to be assumed to exceed an allowable amount. The specified period of time for which the bypass passage opening means is controlled to be ON is a prescribed value which is sufficiently long enough for the amount of DME fuel mixed with lubricating oil to achieve an allowable amount or less and is determined by experiment or the like.

According to the invention in the fifth aspect, the function and effect, in addition to the function and effect which is provided by the invention in the first or second aspect, is provided that the bypass passage opening means can be appropriately controlled to be ON and OFF in a simplified manner.

The invention in a sixth aspect is the DME fuel supply device for a diesel engine in any of the first to fifth aspects, in which the injection pump has an injection pump element for pressurizing and delivering the DME fuel in a fuel gallery supplied via the feed pipe from the fuel tank in a specified amount to an injection pipe in communication with a fuel injection nozzle of a diesel engine at specified timing through a delivery valve which can be opened and closed by up-and-down movement of a plunger in engagement with a camshaft rotated by rotation transmitted from a driving shaft of the diesel engine, the injection pump element having a DME fuel vaporizing portion with a gap formed in the sliding contact surface of a plunger barrel receiving the plunger with the plunger and adapted to reduce in pressure and vaporize the DME fuel in a liquid state leaked between the sliding contact surfaces of the plunger and the plunger barrel from the fuel gallery and the top of the plunger toward the cam chamber, before flowing into the cam chamber.

The fuel gallery of the injection pump is filled with DME fuel in a liquid state under high pressure, and the DME fuel supplied to the injection pump element from the fuel gallery slightly leaks toward the cam chamber through a small gap between the sliding contact surfaces of the plunger and the plunger barrel due to the pressure of the DME fuel pressurized by the plunger. When DME enters the cam chamber in a liquid state, it is mixed with lubricating oil. Forming the gap in the sliding contact surface of the plunger barrel with the plunger adapted to reduce the pressure of DME fuel in a liquid state under high pressure leaked from the fuel gallery, can reduce the pressure of DME fuel in a liquid state, which vaporizes at room temperature, under high pressure to saturated vapor pressure or below and vaporize it before flowing into the cam chamber in a liquid state.

More specifically, the DME fuel vaporizing portion uses the law that liquid reduces in pressure and loses its energy through abrupt expansion, as well as the characteristic specific to DME fuel that it vaporizes at atmospheric pressure and temperature, to reduce in pressure and vaporize DME fuel pressurized to a liquid state. Therefore, DME fuel in a liquid state under high pressure from the fuel gallery and the top of the plunger is reduced in pressure and vaporized at the gap before flowing into the cam chamber through the sliding contact surfaces of the plunger and the plunger barrel. This can reduce the possibility of DME fuel in a liquid state mixing with lubricating oil in the cam chamber.

According to the invention in the sixth aspect, the function and effect, in addition to the function and effect which is provided by the inventions in the first to fifth aspects, is provided that the DME fuel vaporizing portion having the gap adapted to reduce the pressure of DME fuel in a liquid state under high pressure can prevent DME fuel in a liquid state from mixing with lubricating oil in the cam chamber. Therefore, reduced lubricating performance of lubricating oil caused by DME fuel mixed with the lubricating oil in the cam chamber is prevented, thereby providing the additional function and effect that the period of time when the cam chamber pressure regulating means is bypassed can be reduced.

The invention in a seventh aspect is the DME fuel supply device for a diesel engine in the sixth aspect, in which the gap of the injection pump is formed by an annular groove formed circumferentially in the peripheral surface of the plunger.

According to the invention in the seventh aspect, the function and effect, in addition to the function and effect which is provided by the invention in the sixth aspect, is provided that cutting work to form the gap of the DME fuel vaporizing portion of the injection pump is facilitated since the gap is formed in the plunger, more specifically in the outer peripheral surface of the plunger.

The invention in an eighth aspect is the DME fuel supply device for a diesel engine in the sixth aspect, in which the gap of the injection pump is formed by an annular groove formed circumferentially in the inner peripheral surface of the plunger barrel.

The gap of the injection pump may be thus formed in the inner peripheral surface of the plunger barrel in sliding contact with the outer peripheral surface of the plunger. This provides the function and effect which is provided by the invention in the sixth aspect.

The invention in a ninth aspect is the DME fuel supply device for a diesel engine in the seventh or eighth aspect, in which the DME fuel vaporizing portion of the injection pump has a plurality of the annular grooves.

The plurality of annular grooves forms a plurality of gaps which can reduce the pressure of DME fuel in a liquid state under high pressure in a stepwise manner. Therefore, the gaps formed by the annular grooves can be reduced in size, thereby reducing the possibility that the sliding contact surfaces of the plunger and the plunger barrel of the injection pump formed with high accuracy are reduced in accuracy.

According to the invention in the ninth aspect, the function and effect, in addition to the function and effect which is provided by the invention in the seventh or eight aspect, is provided that the effect of forming the DME fuel vaporizing portion on the accuracy of the plunger and the plunger barrel of the injection pump can be reduced.

The invention in a tenth aspect is the DME fuel supply device for a diesel engine in the sixth to ninth aspects, in which the DME fuel vaporizing portion of the injection pump has the gap formed in the sliding contact surface of the plunger barrel with the plunger on the cam chamber side.

DME fuel in a liquid state under high pressure leaked between the sliding contact surfaces of the plunger and the plunger barrel is gradually reduced in pressure while flowing toward the cam chamber. Since the DME fuel vaporizing portion is formed on the cam chamber side, the DME fuel reduced in pressure to a certain level is reduced in pressure and vaporized. Therefore, DME fuel in a liquid state under high pressure can be effectively reduced in pressure and vaporized.

According to the invention in the tenth aspect, the function and effect, in addition to the function and effect which is provided by the invention in the sixth to ninth aspects, is provided that DME fuel in a liquid state under high pressure leaked between the plunger and the plunger barrel of the injection pump can be effectively reduced in pressure and vaporized.

The invention in an eleventh aspect is the DME fuel supply device for a diesel engine in the first to tenth aspects, having a configuration such that the DME fuel delivered from the injection pump is supplied to a common rail, from which the DME fuel is delivered to the fuel injection nozzle.

According to the invention in the eleventh aspect, the common-rail type DME fuel supply device for a diesel engine provides the function and effect which is provided by the invention in the first to tenth aspects as described above.

The invention in a twelfth aspect is an injection pump of the DME fuel supply device for a diesel engine, having an injection pump element for pressurizing and delivering the DME fuel in a fuel gallery supplied via a feed pipe from a fuel tank in a specified amount to an injection pipe in communication with a fuel injection nozzle of a diesel engine at specified timing through a delivery valve which can be opened and closed by up-and-down movement of a plunger in engagement with a camshaft rotated by rotation transmitted from a driving shaft of the diesel engine, the injection pump element having a DME fuel vaporizing portion with a gap formed in the sliding contact surface of a plunger barrel receiving the plunger with the plunger and adapted to reduce in pressure and vaporize the DME fuel in a liquid state leaked between the sliding contact surfaces of the plunger and the plunger barrel from the fuel gallery toward a cam chamber, before flowing into the cam chamber.

As described above, the fuel gallery of the injection pump is filled with DME fuel in a liquid state under high pressure, and the DME fuel supplied to the injection pump element from the fuel gallery slightly leaks toward the cam chamber through a small gap between the sliding contact surfaces of the plunger and the plunger barrel due to its pressure. Forming the gap in the sliding contact surface of the plunger barrel with the plunger adapted to reduce the pressure of DME fuel in a liquid state under high pressure leaked from the fuel gallery, can reduce the pressure of DME fuel in a liquid state, which vaporizes at room temperature, under high pressure to saturated vapor pressure or below and vaporize it before flowing into the cam chamber.

More specifically, the DME fuel vaporizing portion uses the law that liquid reduces in pressure and loses its energy through abrupt expansion, as well as the characteristic specific to DME fuel that it vaporizes at atmospheric pressure and temperature, to reduce in pressure and vaporize DME fuel pressurized to a liquid state. Therefore, DME fuel in a liquid state under high pressure from the fuel gallery is reduced in pressure and vaporized at the gap before flowing into the cam chamber through the sliding contact surfaces of the plunger and the plunger barrel. This can prevent DME fuel in a liquid state from mixing with lubricating oil in the cam chamber.

According to the invention in the twelfth aspect, the DME fuel vaporizing portion having the gap adapted to reduce the pressure of DME fuel in a liquid state under high pressure, can prevent the DME fuel in a liquid state from mixing with lubricating oil in the cam chamber. This provides the function and effect that reduced lubricating performance of lubricating oil caused by DME fuel in a liquid state mixed with the lubricating oil in the cam chamber can be prevented.

The invention in a thirteenth aspect is the injection pump in the twelfth aspect, in which the gap is formed by an annular groove formed circumferentially in the peripheral surface of the plunger.

According to the invention in the thirteenth aspect, the function and effect, in addition to the function and effect which is provided by the invention in the twelfth aspect, is provided that cutting work to form the gap of the DME fuel vaporizing portion is facilitated since the gap is formed in the plunger, more specifically in the outer peripheral surface of the plunger.

The invention in a fourteenth aspect is the injection pump in the twelfth aspect, in which the gap is formed by an annular groove formed circumferentially in the inner peripheral surface of the plunger barrel.

The gap may be thus formed in the inner peripheral surface of the plunger barrel in sliding contact with the outer peripheral surface of the plunger. This provides the function and effect which is provided by the invention in the twelfth aspect.

The invention in a fifteenth aspect is the injection pump in the thirteenth or fourteenth aspect, in which the DME fuel vaporizing portion has a plurality of the annular grooves.

The plurality of annular grooves forms a plurality of gaps which can reduce the pressure of DME fuel in a liquid state under high pressure in a stepwise manner. Therefore, the gaps formed by the annular grooves can be reduced in size, thereby reducing the possibility that the sliding contact surfaces of the plunger and the plunger barrel formed with high accuracy are reduced in accuracy.

According to the invention in the fifteenth aspect, the function and effect, in addition to the function and effect which is provided by the invention in the thirteenth or fourteenth aspect, is provided that the effect of forming the DME fuel vaporizing portion on the accuracy of the plunger and the plunger barrel can be reduced.

The invention in a sixteenth aspect is the injection pump in any of the twelfth to fifteenth aspects, in which the DME fuel vaporizing portion has the gap formed in the sliding contact surface of the plunger barrel with the plunger on the cam chamber side.

DME fuel in a liquid state under high pressure leaked between the sliding contact surfaces of the plunger and the plunger barrel is gradually reduced in pressure while flowing toward the cam chamber. Since the DME fuel vaporizing portion is formed on the cam chamber side, the DME fuel reduced in pressure to a certain level is reduced in pressure and vaporized. Therefore, DME fuel in a liquid state under high pressure can be effectively reduced in pressure and vaporized.

According to the invention in the sixteenth aspect, the function and effect, in addition to the function and effect which is provided by the invention in the twelfth to fifteenth aspects, is provided that DME fuel in a liquid state under high pressure leaked between the plunger and the plunger barrel can be effectively reduced in pressure and vaporized.

The invention in a seventeenth aspect is the DME fuel supply device for a diesel engine provided with the injection pump in the twelfth to sixteenth aspects.

According to the invention in the seventeenth aspect, the DME fuel supply device for a diesel engine provides the function and effect which is provided by the invention in any of the twelfth to sixteenth aspects as described above.

BEST MODE FOR CARRYING OUT THE INVENTION

An embodiment of the invention of the present application will be described below with reference to the drawings.

Figure 1:
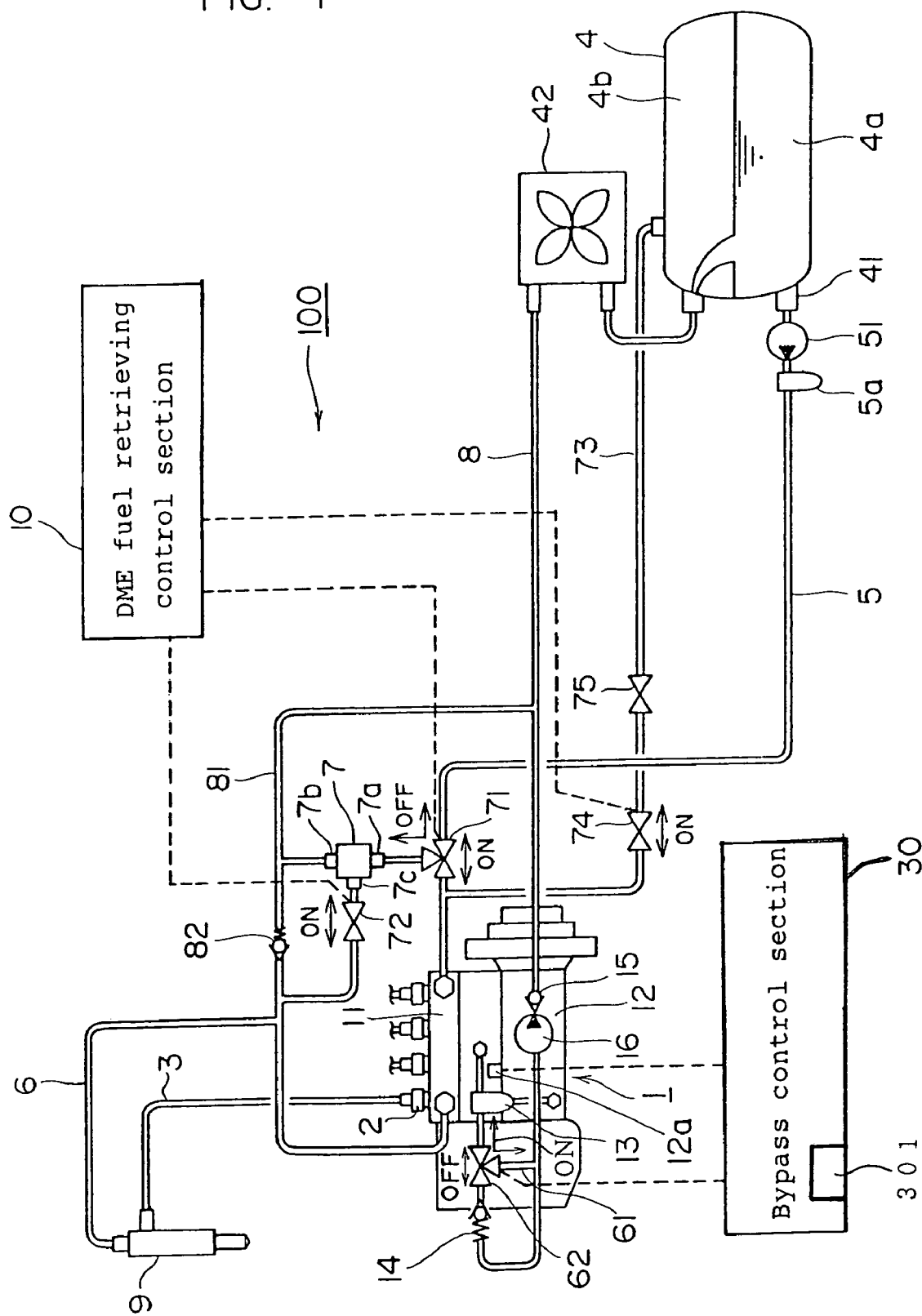
FIG. 1 is a schematic diagram of a first embodiment of a DME fuel supply device according to the invention of the present application.

First, a general structure of a DME fuel supply device for a diesel engine will be described. FIG. 1 is a schematic diagram of a first embodiment of a DME fuel supply device according to the invention of the present application.

A DME fuel supply device 100 to supply DME fuel to a diesel engine has an injection pump 1. The injection pump 1 has the same number of injection pump elements 2 as the number of cylinders which the diesel engine has. A feed pump 51 pressurizes a liquid phase part 4a of DME fuel reserved in a fuel tank 4 to a specified pressure and delivers it into a feed pipe 5. The fuel tank 4 has a DME fuel delivery port 41 which is located below the level of the DME fuel in the fuel tank 4, and the feed pump 51 is disposed in the vicinity of the DME fuel delivery port 41 of the fuel tank 4. The DME fuel delivered into the feed pipe 5 is filtered by a filter 5a, and delivered to the injection pump 1 via a three-way solenoid valve 71. The three-way solenoid valve 71 is ON in an injection state (while the diesel engine is operating) and permits flow in the direction indicated in the drawing.

The DME fuel pressurized to a specified pressure by the feed pump 51 and delivered from the fuel tank 4 is delivered under pressure in a specified amount from each of the injection pump elements 2 of the injection pump 1 to a fuel injection nozzle 9 provided in each of the cylinders of the diesel engine via an injection pipe 3 at specified timing. An overflow fuel pipe 81 is provided with an overflow valve 82 to maintain the pressure of DME fuel in a fuel gallery 11 at a specified pressure and to regulate overflowed DME fuel to flow only in the direction of being returned to the fuel tank. The DME fuel overflowed from the injection pump 1 is returned to the fuel tank 4 via the overflow fuel pipe 81, the overflow valve 82, an overflow return pipe 8 and a cooler 42. The DME fuel overflowed from the fuel injection nozzle 9 is returned to the fuel tank 4 via a nozzle return pipe 6, the overflow fuel pipe 81, the overflow return pipe 8 and the cooler 42.

The DME fuel supply device 100 also has an aspirator 7, the three-way solenoid valve 71, a two-way solenoid valve 72 and a DME fuel retrieving control section 10, as means for retrieving DME fuel remaining in the fuel gallery 11 in the injection pump 1, the overflow fuel pipe 81, the injection pump element 2, the injection pipe 3 and the nozzle return pipe 6 to the fuel tank 4 when the diesel engine is stopped. The DME fuel retrieving control section 10 detects the operating and stopping states of the diesel engine (the injection and non-injection states of the DME fuel supply device 100) and controls the three-way solenoid valve 71, the two-way solenoid valve 72, the feed pump 51 and the like to be ON/OFF in accordance with the detected state. When the diesel engine is stopped, the DME fuel retrieving control section 10 starts control to retrieve DME fuel remaining in the fuel gallery 11, the overflow fuel pipe 81, the injection pump element 2, the injection pipe 3 and the nozzle return pipe 6.

The aspirator 7 has an inlet 7a, an outlet 7b and a suction port 7c. The inlet 7a and the outlet 7b are communicated with each other via a straight communication passage, and the suction port 7c is branched at generally a right angle from the communication passage between the inlet 7a and the outlet 7b. The outlet of a communication passage, through which flow can pass when the three-way solenoid valve 71 is OFF, is connected to the inlet 7a, and the outlet 7b is connected to a passage to the fuel tank 4 via the cooler 42. The suction port 7c is connected to the two-way solenoid valve 72, which is closed in an OFF state in the injection state (while the diesel engine is operating).

In the non-injection state (while the diesel engine is stopped), the DME fuel retrieving control section 10 controls the three-way solenoid valve 71 to be OFF to form the communication passage between the feed pipe 5 and the inlet 7a of the aspirator 7, and also controls the two-way solenoid valve 72 to be ON to communicate the overflow fuel pipe 81 upstream from the overflow valve 82 and the suction port 7c of the aspirator 7. Thus, DME fuel delivered from the feed pump 51 is delivered not to the injection pump 1 but to the aspirator 7, passed from the inlet 7a to the outlet 7b, returned to the fuel tank 4 via the overflow fuel pipe 81 downstream from the overflow valve 82, the overflow return pipe 8 and the cooler 42, and delivered again from the feed pump 51 to the aspirator 7. That is, the DME fuel is circulated via the aspirator 7. DME fuel remaining in the fuel gallery 11 in the injection pump 1 as well as in the overflow fuel pipe 81 upstream from the overflow valve 82 is drawn through the suction port 7c by suction force produced by the flow of the DME fuel from the inlet 7a to the outlet 7b, joins the flow and is retrieved to the fuel tank 4. Since the DME fuel retrieving control section 10 controls the two-way solenoid valve 72 to be ON in the non-injection state, the nozzle return pipe 6 and the overflow fuel pipe 81 upstream from the overflow valve 82 are communicated with each other so that DME fuel remaining in the nozzle return pipe 6 is drawn through the suction port 7c via the overflow fuel pipe 81 upstream from the overflow valve 82 and retrieved to the fuel tank 4.

The DME fuel supply device 100 also has a vapor-phase pressure delivery pipe 73 connecting an outlet for a vapor phase 4b in the fuel tank 4 and an inlet of the fuel gallery 11 of the injection pump 1. The vapor-phase pressure delivery pipe 73 has a small-diameter portion 75 where the inside diameter is partially reduced, and a vapor-phase pressure delivery pipe opening solenoid valve 74 for opening the vapor-phase pressure delivery pipe 73 so that flow can pass there through. While DME fuel in the fuel gallery 11, the overflow fuel pipe 81 and the nozzle return pipe 6 is drawn and retrieved to the fuel tank 4 by the foregoing "residual fuel retrieving means," the DME fuel retrieving control section 10 controls the vapor-phase pressure delivery pipe opening solenoid valve 74 to be ON so that flow can pass through the vapor-phase pressure delivery pipe 73 connecting the vapor phase 4b in the fuel tank 4 and the inlet of the fuel gallery 11. The DME fuel in a liquid state remaining in the fuel gallery 11 and the overflow fuel pipe 81 is delivered under pressure to the suction port 7c of the aspirator 7 by the high-pressure vapor phase 4b.

A cam chamber 12 in the injection pump 1 has an exclusive lubricating system which is separated from the lubricating system of the diesel engine. An oil separator 13 separates lubricating oil in the cam chamber 12 in the injection pump 1 containing DME fuel leaked into the cam chamber 12 into DME fuel and lubricating oil and returns the lubricating oil to the cam chamber 12. The DME fuel separated by the oil separator 13 is delivered to a compressor 16 as "suction means" via a check valve 14 as "cam chamber pressure regulating means" for preventing the pressure in the cam chamber 12 from decreasing to atmospheric pressure or below, pressurized in the compressor 16, and returned to the fuel tank 4 via a check valve 15 and the cooler 42. The check valve 15 is provided to prevent DME fuel from flowing in reverse direction from the fuel tank 4 to the cam chamber 12 when the diesel engine is stopped. The compressor 16 is driven by a cam in the cam chamber 12.

A bypass passage 61 is interposed between an outlet of the oil separator 13 and the compressor 16, which is routed around the check valve 14 and directly communicates the outlet of the oil separator 13 to the compressor 16. A three-way solenoid valve 62 is disposed between the outlet of the oil separator 13 and the check valve 14, as "bypass passage opening means" for switching between a communication passage to communicate the outlet of the oil separator 13 to the check valve 14 and a communication passage to communicate the outlet of the oil separator 13 to the bypass passage 61. The three-way solenoid valve 62 forms the communication passage to communicate the outlet of the oil separator 13 to the check valve 14 while being controlled to be OFF, and forms the communication passage to communicate the outlet of the oil separator 13 to the bypass passage 61 so that flow can pass through the bypass passage 61, while ON.

The inside of the cam chamber 12 is provided with a cam chamber sensor 12a as "cam chamber state detecting means" for detecting the viscosity of lubricating oil in the cam chamber 12. The detection value of the viscosity of lubricating oil detected by the cam chamber sensor 12a is outputted to a bypass control section 30 as "bypass controlling means," which in turn controls the three-way solenoid valve 62 to be ON/OFF based on the detection value outputted from the cam chamber sensor 12a. The cam chamber sensor 12a may be any sensor as long as it can detect the level of DME fuel contained in lubricating oil. For example, it may be a sensor for detecting the concentration of lubricating oil in the cam chamber 12, a sensor for detecting the pressure in the cam chamber 12 or a sensor for detecting the temperature in the cam chamber 12, or a sensor for detecting at least two of the above.

The bypass control section 30 controls the three-way solenoid valve 62 to be ON so as to communicate the outlet of the oil separator 13 to the bypass passage 61, when the detection value of the viscosity of lubricating oil detected by the cam chamber sensor 12a exceeds a predetermined allowable value, that is, when the viscosity of lubricating oil is reduced below a predetermined viscosity by the DME fuel leaked into the cam chamber 12 through the injection pump element 2 from the fuel gallery 11 and mixed with lubricating oil, which means that its lubricating performance is reduced below an allowable level. When the outlet of the oil separator 13 is communicated with the bypass passage 61, the cam chamber 12 is pumped by the compressor 16 with the check valve 14 for regulating the pressure in the cam chamber 12 at atmospheric pressure or above bypassed, so that the pressure in the cam chamber 12 is reduced to atmospheric pressure or below. This highly accelerates vaporization of DME fuel mixed with lubricating oil. The vaporized DME fuel is separated from the lubricating oil by the oil separator 13 and then pumped by the compressor 16 and retrieved to the fuel tank 4. The bypass control section 30 controls the three-way solenoid valve 62 to be OFF so as to close the bypass passage 61 and communicate the outlet of the oil separator 13 to the check valve 14, when the detection value of the viscosity of lubricating oil outputted by the cam chamber sensor 12a achieves the predetermined allowable value or below, that is, when the viscosity of lubricating oil achieves the predetermined viscosity or above, which means that its lubricating performance returns to the allowable level or above, as a result of the pressure in the cam chamber sensor 12 being reduced to highly accelerate vaporization of the DME fuel mixed with the lubricating oil to be removed from the lubricating oil.

In such a manner as described, temporarily reducing the pressure in the cam chamber 12 to atmospheric pressure or below highly accelerates vaporization of DME fuel mixed with lubricating oil, so that it can be retrieved to the fuel tank 4 in a short time. This prevents reduced lubricating performance of lubricating oil caused by DME fuel leaked into the cam chamber 12 in the injection pump 1. Further, the three-way solenoid valve 62 is controlled to be ON/OFF in accordance with the viscosity of lubricating oil detected by the cam chamber sensor 12a. This allows the amount of DME fuel mixed with lubricating oil to be constantly held at a specified amount or less. This also allows the period of time when the check valve 14 is bypassed to be minimized, thereby minimizing the possibility of oxygen entering the cam chamber 12 which is caused by the check valve 14 being bypassed.

Figure 2:
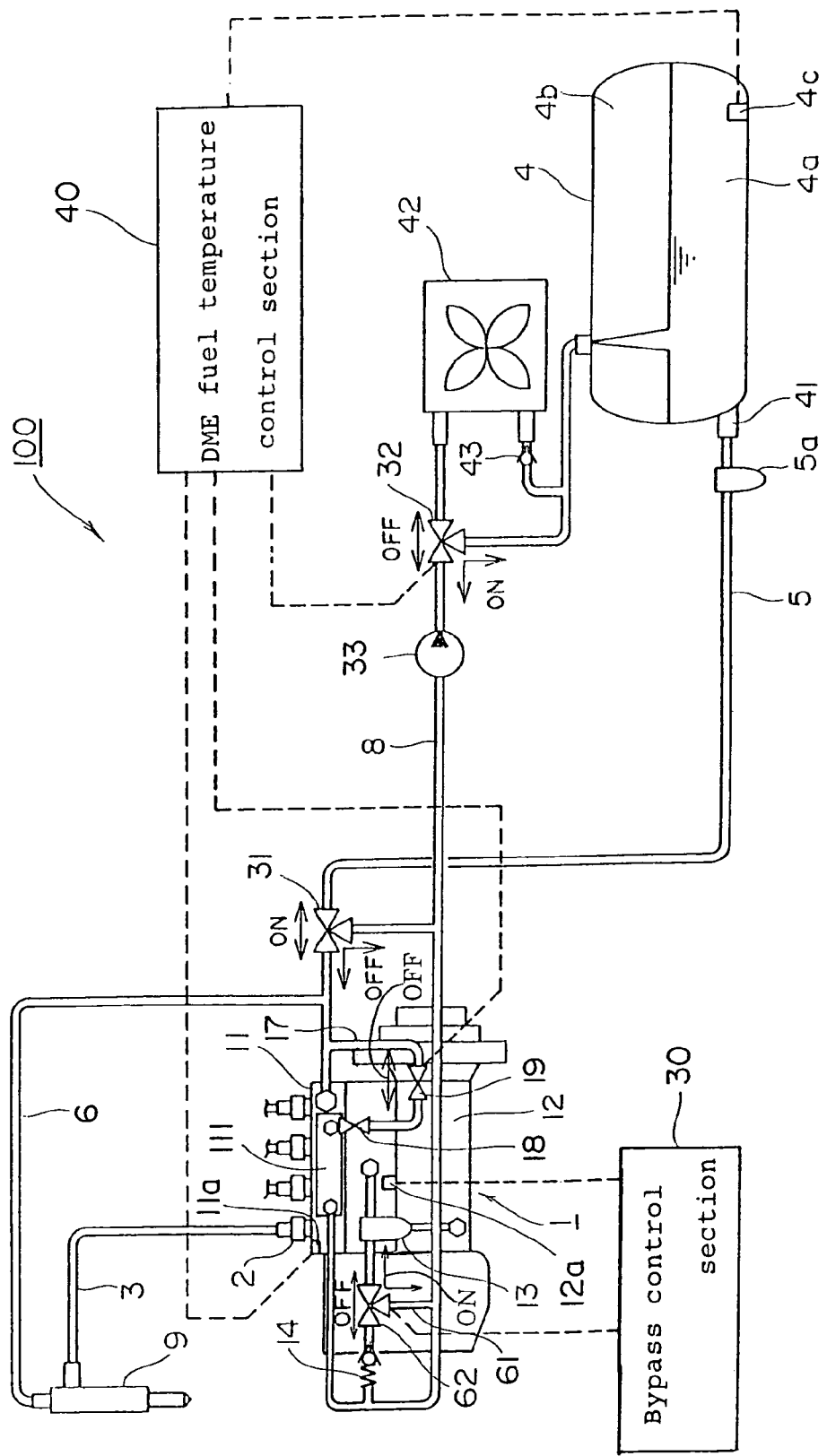
FIG. 2 is a schematic diagram of a second embodiment of the DME fuel supply device according to the invention of the present application.

Next, a second embodiment of the DME fuel supply device 100 according to the invention of the present application will be described with reference to the drawings. FIG. 2 is a schematic diagram of a second embodiment of the DME fuel supply device 100 according to the invention of the present application. Similar parts are denoted by the same reference numerals as with the first embodiment, and description will be omitted.

A DME fuel supply device 100 to supply DME fuel to a diesel engine according to the invention of the present application has an injection pump 1. A liquid phase part 4a of DME fuel in a fuel tank 4 is discharged from a liquid phase fuel outlet 41, filtered by a filter 5a and then supplied to a fuel gallery 11 in the injection pump 1 via a feed pipe 5 and a three-way solenoid valve 31. The three-way solenoid valve 31 is ON in an injection state (while the diesel engine is operating) and communicates the feed pipe 5 to the fuel gallery 11. The injection pump 1 has the same number of injection pump elements 2 as the number of cylinders which the diesel engine has. A fuel delivery port of the injection pump element 2 is connected to an injection pipe 3 which is connected to a fuel injection nozzle 9. DME fuel compressed to a high pressure is delivered under pressure from the injection pump 1 to the fuel injection nozzle 9 via the injection pipe 3. DME fuel overflowed from the fuel injection nozzle 9 is returned to the feed pipe 5 via a nozzle return pipe 6 and then supplied again to the fuel gallery 11.

DME fuel is supplied as a coolant from the fuel tank 4 to the outside of the fuel gallery 11 via a coolant supply pipe 17, which is branched from the feed pipe 5, as regulating means of the temperature of fuel in a fuel gallery for cooling DME fuel in the fuel gallery 11. The DME fuel supplied as a coolant is supplied to a fuel vaporizer 18 via a coolant supply pipe opening solenoid valve 19. The DME fuel vaporized by the fuel vaporizer 18 is supplied to a cooling device of fuel in a fuel gallery 111 using the heat produced by the vaporization, to cool the DME fuel in the fuel gallery 11. The DME fuel supplied as a coolant to the cooling device of fuel in a fuel gallery 111 is pumped by an electric compressor 33 and returned to the fuel tank 4.

The DME fuel pressurized in the electric compressor 33 is cooled by a cooler 42 and then returned to the fuel tank 4 (a first return passage) when a return passage switching solenoid valve 32 is OFF. When the return passage switching solenoid valve 32 is ON, the DME fuel pressurized in the electric compressor 33 is returned to the fuel tank 4 without passing through the cooler 42, that is, without being cooled (a second return passage). Therefore, controlling the return passage switching solenoid valve 32 to be ON/OFF can regulate the temperature of DME fuel to be returned to the fuel tank 4, thereby controlling the temperature of DME fuel in the fuel tank 4. A check valve 43 prevents DME fuel from flowing in reverse direction from the second return passage to the cooler 42.

The coolant supply pipe opening solenoid valve 19 is controlled by a DME fuel temperature control section 40 based on the temperature of DME fuel in the fuel gallery 11 detected by a fuel gallery temperature sensor 11a. Controlling the coolant supply pipe opening solenoid valve 19 to be ON and OFF permits and shuts off the supply of the coolant to the cooling device of fuel in a fuel gallery 111. The return passage switching solenoid valve 32 is controlled to be ON/OFF by the DME fuel temperature control section 40 based on the temperature of DME fuel in the fuel tank 4 detected by a fuel tank temperature sensor 4c.

DME fuel in the fuel tank 4 is delivered under pressure to the feed pipe 5 with the relative difference in pressure between DME fuel in the fuel gallery 11 cooled by the cooling device of fuel in a fuel gallery 111 and the DME fuel in the fuel tank 4, caused by the difference in temperature there between. More specifically, the DME fuel supply device 100 indicated in this embodiment has no pump for delivering DME fuel from the fuel tank 4 to the injection pump 1, but has a configuration such that the DME fuel in the fuel tank 4 is supplied to the injection pump 1 with the difference in pressure between the inside of the fuel gallery 11 and the inside of the fuel tank 4 caused by the DME fuel in the fuel gallery 11 being cooled. Therefore, the fuel gallery 11 has no overflow passage, and the amount of DME fuel to be supplied is the amount delivered under pressure by the injection pump element 2 from the fuel gallery 11 to the fuel injection nozzle 9 via the injection pipe 3. DME fuel overflowed from the fuel injection nozzle 9 is not returned to the fuel tank 4 as in the prior art, but returned to the feed pipe 5 via a nozzle return pipe 6 and then supplied again to the fuel gallery 11.

A cam chamber 12 in the injection pump 1 has an exclusive lubricating system which is separated from the lubricating system of the diesel engine. An oil separator 13 separates lubricating oil in the cam chamber 12 in the injection pump 1 containing DME fuel leaked into the cam chamber 12 into DME fuel and lubricating oil and returns the lubricating oil to the cam chamber 12. The DME fuel separated by the oil separator 13 is delivered to the electric compressor 33 via a check valve 14 as "cam chamber pressure regulating means" for preventing the pressure in the cam chamber 12 from decreasing to atmospheric pressure or below, pressurized in the electric compressor 33, and returned to the fuel tank 4 via the cooler 42.

As with the foregoing first embodiment, a bypass passage 61 is interposed between an outlet of the oil separator 13 and the electric compressor 33, which is routed around the check valve 14 and directly communicates the outlet of the oil separator 13 to the electric compressor 33. A three-way solenoid valve 62 is disposed between the outlet of the oil separator 13 and the check valve 14, as "bypass passage opening means" for switching between a communication passage to communicate the outlet of the oil separator 13 to the check valve 14 and a communication passage to communicate the outlet of the oil separator 13 to the bypass passage 61. The three-way solenoid valve 62 forms the communication passage to communicate the outlet of the oil separator 13 to the check valve 14 while being controlled to be OFF, and forms the communication passage to communicate the outlet of the oil separator 13 to the bypass passage 61 so that flow can pass through the bypass passage 61, while ON.

The inside of the cam chamber 12 is provided with a cam chamber sensor 12a as "cam chamber state detecting means" for detecting the viscosity of lubricating oil in the cam chamber 12. The detection value of the viscosity of lubricating oil detected by the cam chamber sensor 12a is outputted to a bypass control section 30 as "bypass controlling means," which in turn controls the three-way solenoid valve 62 to be ON/OFF based on the detection value outputted from the cam chamber sensor 12a. Description of the bypass control section 30 will be omitted since it is the same as with the first embodiment.

In such a manner as described, the DME fuel supply device 100 without a feed pump indicated in this embodiment can also prevent reduced lubricating performance of lubricating oil caused by DME fuel leaked into the cam chamber 12 of the injection pump 1, by the pressure in the cam chamber 12 being temporarily reduced to atmospheric pressure or below, as with the first embodiment described above.

Figure 3:
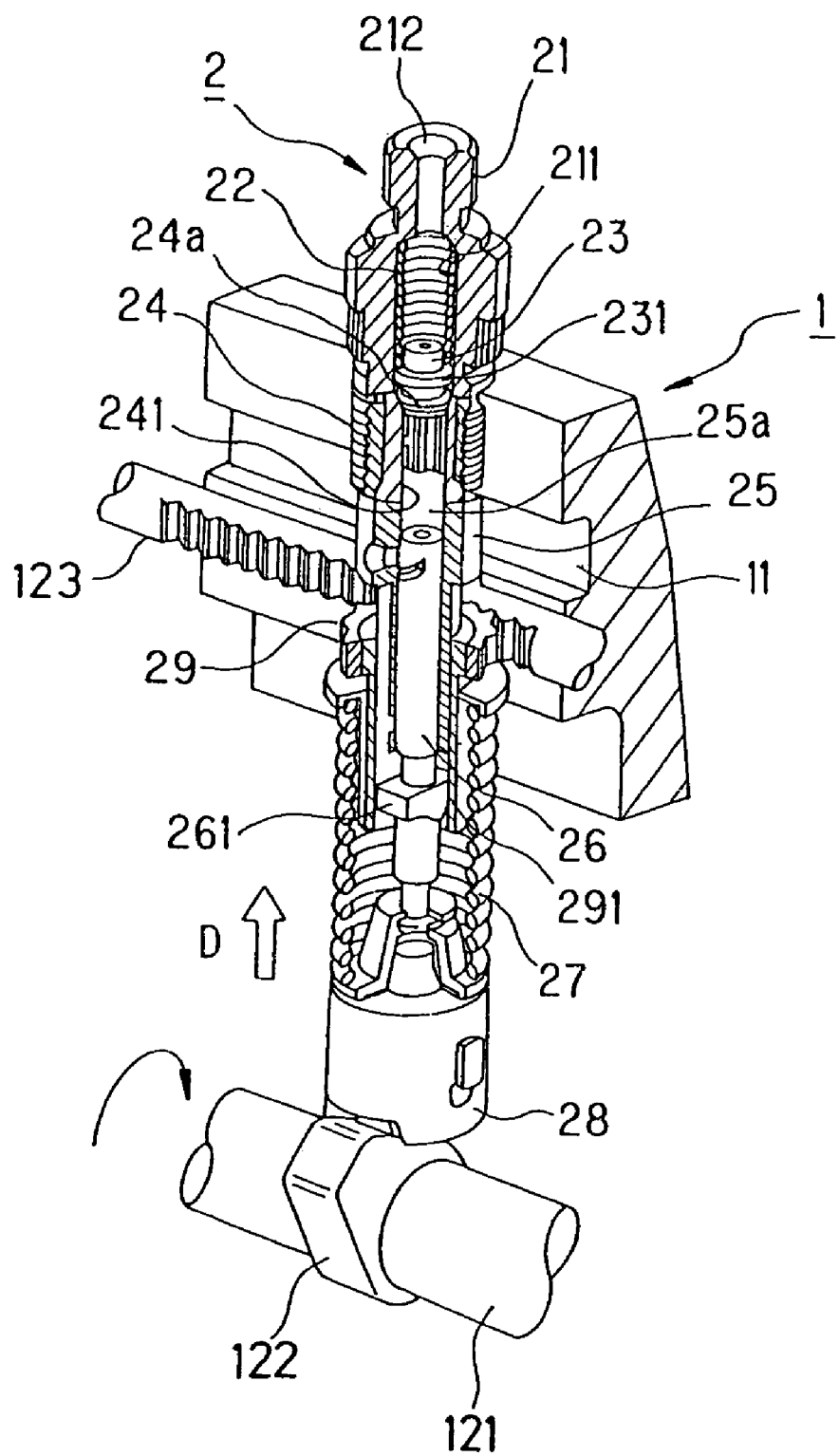
FIG. 3 is a perspective view showing a portion of an injection pump element of an injection pump and its vicinity in section.
Figure 4:
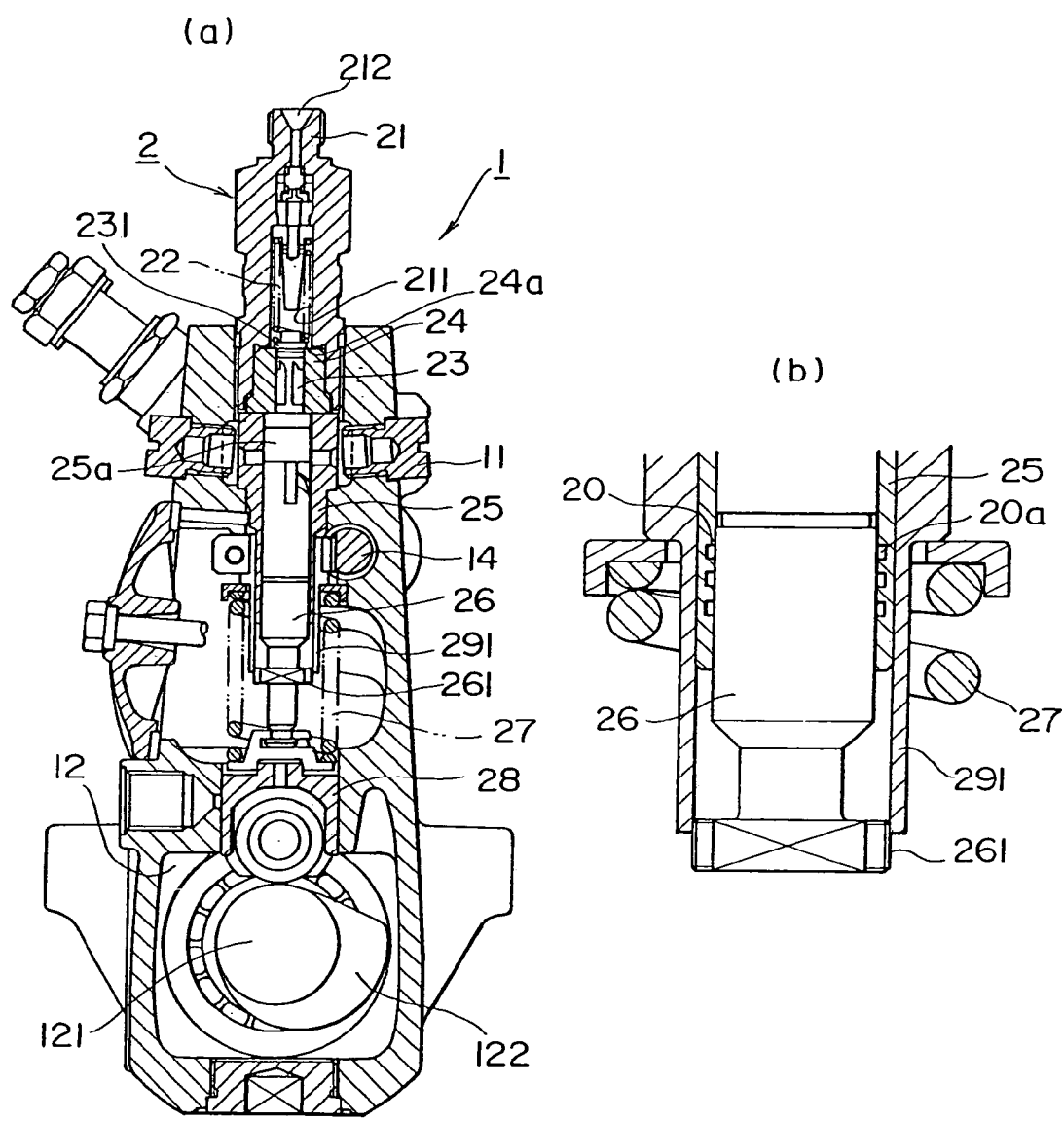
FIG. 4 is a sectional view of the injection pump, in which (a) is an overall side view and (b) shows a portion of a plunger on an enlarged scale.

Now, as a third embodiment of the invention of the present application, the DME fuel supply device 100 having the injection pump element 2 formed with a gap adapted to vaporize DME fuel leaking into the cam chamber 12 in addition to the first embodiment or second embodiment will be described with reference to the drawings. FIG. 3 is a perspective view showing a portion of an injection pump element 2 of an injection pump 1 configuring a DME fuel supply device 100 according to the invention of the present application and its vicinity in section. FIG. 4 is a vertical sectional view of the injection pump 1 according to the invention of the present application, in which (a) is an overall sectional view and (b) is a sectional view of a portion of a plunger on an enlarged scale.

A delivery valve holder 21 has a delivery valve insertion hole 211 and is fixed to the base of the injection pump 1. An injection pipe 3 is connected to a fuel delivery port 212 communicated with the delivery valve insertion hole 211. A delivery valve 23 is received in the delivery valve insertion hole 211 for reciprocating movement and urged by a delivery spring 22 such that a valve part 231 of the delivery valve 23 is in contact with a valve seat part 24a of a delivery valve seat 24 disposed integrally with the delivery valve holder 21.

A plunger barrel 25 is disposed integrally with the delivery valve seat 24 and has a compression chamber 25a communicated with an inner periphery 241 of the delivery valve seat 24. A plunger 26 is received in the compression chamber 25a for reciprocating movement and has an end opposed to the delivery valve 23. The plunger 26 is urged toward a cam 122 by a plunger spring 27. The plunger 26 is pushed up toward the delivery valve 23 (in the direction indicated by the arrow D) via a tappet 28 by the cam 122 of a camshaft 121 connected to the driving shaft of a diesel engine and rotated by the driving force of the diesel engine. The plunger 26 has a flange 261 received in a sleeve 291 that is a cylindrical member integrated with a pinion 29 which is rotated in engagement with a control rack 123. The pinion 29 is rotated by the reciprocating motion of the control rack 123, and the plunger 26 is thereby rotated circumferentially. The injection amount of DME fuel is increased or decreased according to the rotational position of the plunger 26.

The inner peripheral surface of the plunger barrel 25 receiving the plunger 26 is circumferentially formed with three annular grooves 20 as "DME fuel vaporizing portions" according to the invention of the present application. A gap 20a is formed by the annular groove 20 in the sliding contact surface of the plunger barrel 25 with the plunger 26. When the compression chamber 25a is filled with DME fuel in a liquid state under high pressure in the fuel gallery 11 and the DME fuel is delivered to the fuel delivery port 212 via the delivery valve 23 through the upstroke of the plunger 26, the DME fuel in a liquid state leaks between the sliding contact surfaces of the plunger 26 and the plunger barrel 25. The DME fuel in a liquid phase leaked between the sliding contact surfaces of the plunger 26 and the plunger barrel 25 is reduced in pressure by the three gaps 20a in a stepwise manner and flows into the cam chamber 12 in a vaporized state. The DME fuel which flowed into the cam chamber 12 in a vaporized state is separated from lubricating oil by an oil separator 13 disposed in the cam chamber 12, pumped by a compressor 16 and delivered to a fuel tank 4.

Incidentally, the size of the gap 20a is so large that the DME fuel in a liquid state leaked between the sliding contact surfaces of the plunger 26 and the plunger barrel 25 through a gap or the like there between can be well reduced in pressure and vaporized Preferably, the gap 20a is a groove which is as small in width and size as possible, since the sliding contact surfaces of the plunger 26 and the plunger barrel 25 are formed with high accuracy and it is required to minimize the effect of the annular groove 20 on the accuracy.

In such a manner as described, the DME fuel in a liquid state under high pressure leaked between the sliding contact surfaces of the plunger 26 and the plunger barrel 25 from the fuel gallery 11 toward the cam chamber 12 is reduced in pressure at the gap 20a and flows into the cam chamber 12 in a vaporized state. The DME fuel in a vapor state which flowed into the cam chamber 12 is separated by the oil separator 13, pumped by the compressor 16 and returned to the fuel tank 4. Therefore, the amount of DME fuel which leaks into the cam chamber 12 and is mixed with lubricating oil in the cam chamber 12 can be reduced. Thus, reduced lubricating performance of lubricating oil caused by DME fuel mixed with the lubricating oil can be prevented, and the period of time when a check valve 14 is bypassed and the pressure in the cam chamber 12 is temporarily reduced to atmospheric pressure or below can be reduced.

Figure 5:
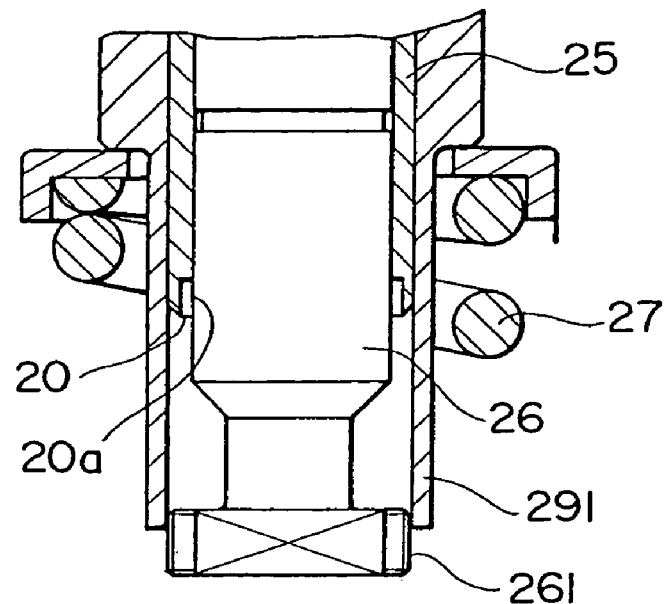
FIG. 5 is an enlarged sectional view of a portion of the injection pump with an annular groove formed in a plunger barrel on the cam chamber side.

A variant of the third embodiment has the annular groove 20 forming the gap 20a formed in the sliding contact surface of the plunger barrel 25 with the plunger 26 on the cam chamber 12 side. FIG. 5 is an enlarged sectional view of a portion of an injection pump 1 with an annular groove 20 formed in a plunger barrel 25 on the cam chamber 12 side.

DME fuel in a liquid state under high pressure leaked between the sliding contact surfaces of the plunger 26 and the plunger barrel 25 is gradually reduced in pressure while flowing toward the cam chamber 12. Since the annular groove 20 is formed on the cam chamber 12 side, that is, a gap 20a is formed on the cam chamber side as described above, the DME fuel reduced in pressure to a certain level is reduced in pressure and vaporized. Therefore, DME fuel in a liquid state under high pressure can be effectively reduced in pressure and vaporized.

Figure 6:
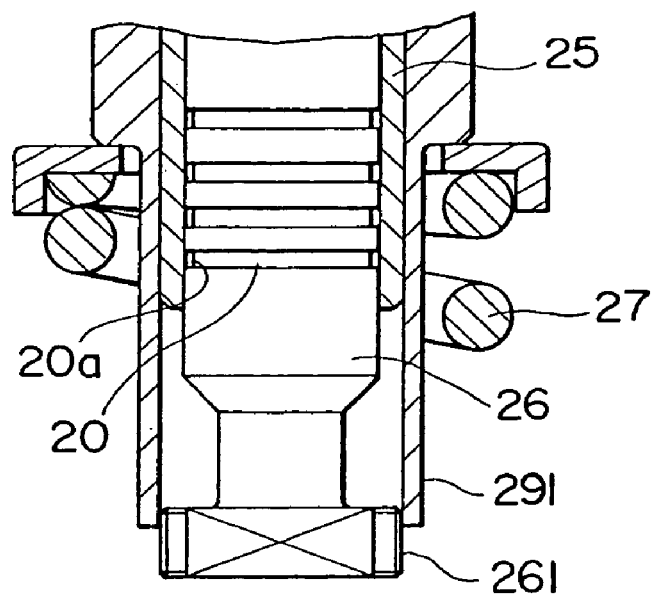
FIG. 6 is an enlarged sectional view of a portion of the injection pump with the annular groove formed in the plunger.

Another variant of the third embodiment has the annular groove 20 formed in the plunger 26. FIG. 6 is an enlarged sectional view of a portion of an injection pump 1 with an annular groove 20 formed in a plunger 26.

The invention of the present application can also be realized by forming the annular groove 20 in the plunger 26 to form the gap 20a in the sliding contact surface of the plunger 26 with the plunger barrel 25, thereby providing the function and effect of the invention of the present application. Further, forming the annular groove 20 in the plunger 26 facilitates its cutting work and achieves high accuracy, which is advantageous.

The invention of the present application as a fourth embodiment is the DME fuel supply device 100 indicated in any of the foregoing first to third embodiments, in which the three-way solenoid valve 62 (bypass passage opening means) is controlled to be OFF so that no flow bypasses the check valve 14, when the detection value detected by the cam chamber sensor 12a exceeds a predetermined allowable value and then a specified period of time elapses. For example, when the detection value detected by the cam chamber sensor 12a exceeds a predetermined allowable value, the three-way solenoid valve 62 is controlled to be ON, and then temporarily controlled to be OFF after a lapse of a specified period of time even if no detection value detected by the cam chamber sensor 12a achieves a predetermined allowable value or below. This prevents a longer period of time when the pressure in the cam chamber 12 is reduced to atmospheric pressure or below. Alternatively, when the detection value detected by the cam chamber sensor 12a exceeds a predetermined allowable value, the three-way solenoid valve 62 is controlled to be ON, and then controlled to be OFF after a lapse of a specified period of time independently of the detection value detected by the cam chamber sensor 12a. The specified period of time is made long enough for DME fuel mixed with lubricating oil to be assumed to be well removed by the pressure in the cam chamber 12 being reduced.

The invention of the present application as a fifth embodiment is the DME fuel supply device 100 indicated in any of the foregoing first to fourth embodiments, having regular intervals bypass controlling means 301 for controlling the three-way solenoid valve 62 to be ON for a specified period of time at predetermined intervals (see FIG. 1). For example, the three-way solenoid valve 62 is controlled to be alternately ON and OFF by the regular intervals bypass controlling means 301 in the bypass control section 30 at regular intervals for a specified period of time. The time intervals at which the three-way solenoid valve 62 is controlled to be ON/OFF are made long enough for the amount of DME fuel mixed with lubricating oil to be assumed to exceed an allowable amount. The specified period of time when the three-way solenoid valve 62 is controlled to be ON is made sufficiently long enough for the amount of DME fuel mixed with lubricating oil to achieve an allowable amount or less. Providing the regular intervals bypassing means as described above allows control of bypassing the check valve 14 in a simplified manner. Therefore, there is no need to provide the cam chamber sensor 12a. Alternatively, the regular intervals bypass controlling means may be provided as backup means in case of trouble with the cam chamber sensor 12a, or the like.

The invention of the present application as a sixth embodiment is the DME fuel supply device 100 indicated in any of the foregoing first to fifth embodiments, which is a common-rail type. The invention of the present application can also be realized in this mode, thereby providing the function and effect of the invention of the present application. More specifically, it has a configuration such that DME fuel delivered from the injection pump is supplied to a common rail, from which the DME fuel is delivered to the fuel injection nozzle.

In the foregoing embodiment, reduced lubricating performance of lubricating oil caused by DME fuel leaked into the cam chamber of the injection pump can be prevented.

Next, the injection pump of the DME fuel supply device of the diesel engine according to the invention of the present application will be described with reference to FIG. 7.

Figure 7:
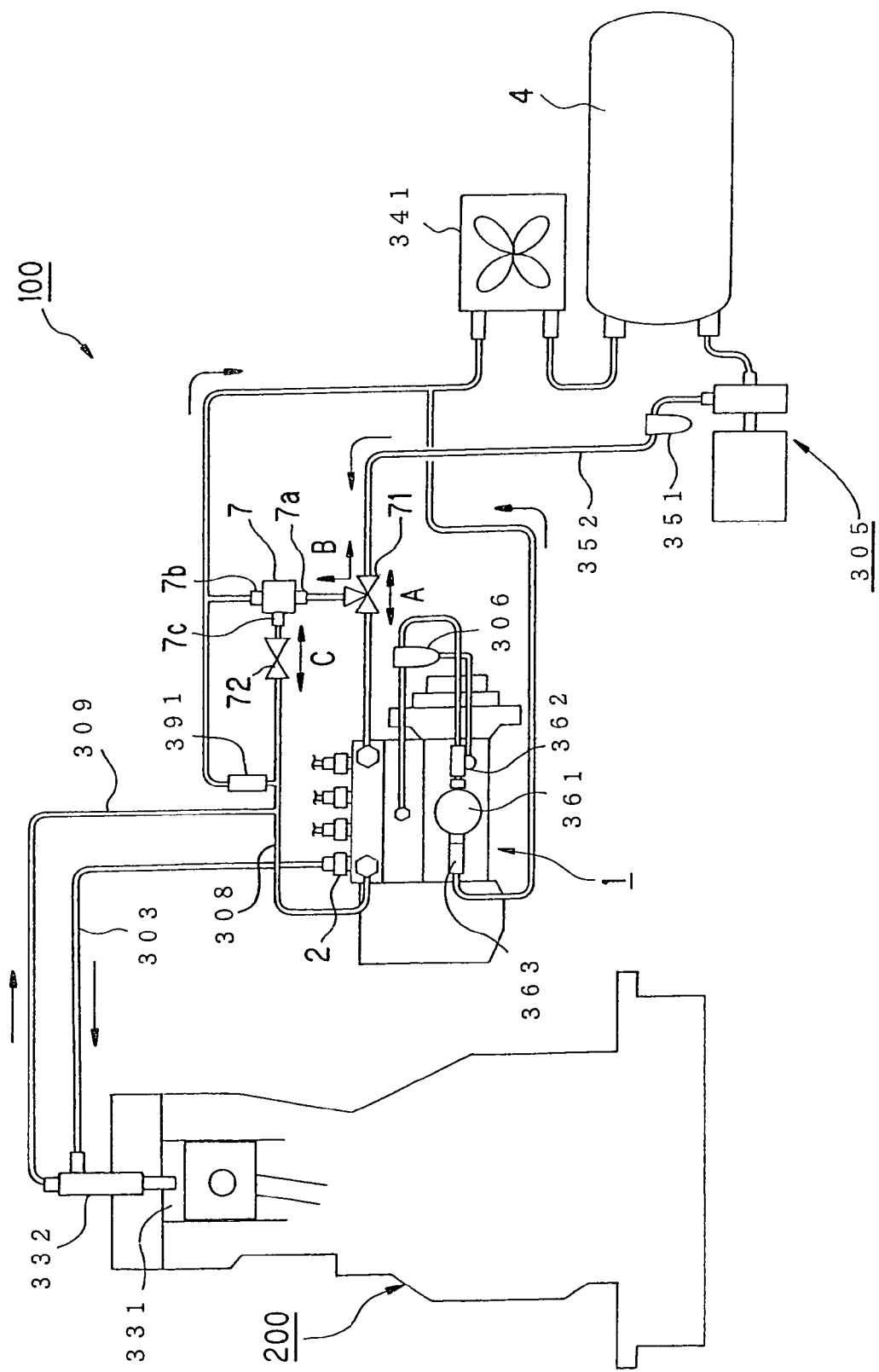
FIG. 7 is a system diagram illustrating a general structure of another embodiment of the DME fuel supply device for a diesel engine according to the invention of the present application.

As shown in FIG. 7, a DME fuel supply device 100 to supply DME fuel to a diesel engine 200 has an injection pump 1. The injection pump 1 has the same number of injection pump elements 2 as the number of cylinders 331 which the diesel engine 200 has. A feed pump 305 pressurizes DME fuel reserved in a fuel tank 4 to a specified pressure and delivers it into a feed pipe 352. The fuel tank 4 has a DME fuel delivery port which is located below the level of the DME fuel in the fuel tank 4, and the feed pump 305 is disposed in the vicinity of the DME fuel delivery port of the fuel tank 4. The DME fuel delivered into the feed pipe 352 is filtered by a filter 351, and delivered to the injection pump 1 via a three-way solenoid valve 71. The three-way solenoid valve 71 is ON in an injection state (while the diesel engine 200 is operating) and permits flow in the direction indicated by the arrow A.

A cam chamber (not shown) in the injection pump 1 has an exclusive lubricating system which is separated from the lubricating system of the diesel engine 200. An oil separator 306 separates lubricating oil in the cam chamber in the injection pump 1 containing DME fuel leaked into the cam chamber into DME fuel and lubricating oil and returns the lubricating oil to the cam chamber. The DME fuel separated by the oil separator 306 is delivered to a compressor 361 driven by a cam in the cam chamber via a check valve 362 for preventing the pressure in the cam chamber from decreasing to atmospheric pressure or below, pressurized in the compressor 361, and returned to the fuel tank 4 via a check valve 363 and a cooler 341. The check valve 363 is provided to prevent DME fuel from flowing in reverse direction from the fuel tank 4 to the cam chamber when the diesel engine 200 is stopped.

Since the cam chamber of the injection pump 1 has en exclusive lubricating system separated from the lubricating system of the diesel engine 200, there is no possibility that DME fuel leaked into the cam chamber from the injection pump element 2 enters the lubricating system of the diesel engine 200. Thus, there is no possibility that DME fuel having entered the lubricating system of the diesel engine 200 is vaporized and the vaporized DME fuel enters a crank chamber of the diesel engine 200 and catches fire.

The DME fuel pressurized to a specified pressure by the feed pump 305 and delivered from the fuel tank 4 is delivered under pressure in a specified amount from each of the injection pump elements 2 of the injection pump 1 to a fuel injection nozzle 332 provided in each of the cylinders 331 of the diesel engine 200 via an injection pipe 303 at specified timing. DME fuel overflowed from the injection pump 1 is returned to the fuel tank 4 via an overflow fuel pipe 308, a check valve 391 for determining the pressure of the overflowed fuel, and the cooler 341. DME fuel overflowed from the fuel injection nozzle 332 is returned to the fuel tank 4 via an overflow fuel pipe 309, the check valve 391 for determining the pressure of the overflowed fuel, and the cooler 341.

The DME fuel supply device 100 has an aspirator 7, the three-way solenoid valve 71 and a two-way solenoid valve 72 as components of "residual fuel retrieving means" for retrieving DME fuel remaining in a fuel gallery (not shown) in the injection pump 1, the overflow fuel pipe 308 and the overflow fuel pipe 309 to the fuel tank 4 when the diesel engine 200 is stopped.

The aspirator 7 has an inlet 7a, an outlet 7b and a suction port 7c. The inlet 7a and the outlet 7b are communicated with each other via a straight communication passage, and the suction port 7c is branched at generally a right angle from the communication passage between the inlet 7a and the outlet 7b. The outlet of a communication passage, through which flow (in the communication direction indicated by the arrow B) can pass when the three-way solenoid valve 71 is OFF, is connected to the inlet 7a, and the outlet 7b is connected to a passage to the fuel tank 4 via the cooler 341. The suction port 7c is connected to the two-way solenoid valve 72, which is OFF in the injection state (while the diesel engine 200 is operating).

In a non-injection state (while the diesel engine 200 is stopped), the three-way solenoid valve 71 is controlled to be OFF to form a communication passage in the direction indicated by the arrow B, and the two-way solenoid valve 72 is controlled to be ON to communicate the overflow fuel pipe 308 and the overflow fuel pipe 309 with the suction port 7c of the aspirator 7 (in the direction indicated by the arrow C). Thus, DME fuel delivered from the feed pump 305 is delivered not to the injection pump 1 but to the aspirator 7, passed from the inlet 7a to the outlet 7b, returned to the fuel tank 4 via the cooler 341 and delivered again from the feed pump 305 to the aspirator 7. That is, the DME fuel is circulated via the aspirator 7. Then, DME fuel remaining in the fuel gallery in the injection pump 1, the overflow fuel pipe 308 and the overflow fuel pipe 309 is drawn through the suction port 7c by the flow of the DME fuel from the inlet 7a to the outlet 7b, and retrieved to the fuel tank 4.

The residual fuel retrieving means uses the feed pump 305 as a driving source and has the aspirator 7 for drawing the DME fuel in the fuel gallery, the overflow fuel pipe 308 and the overflow fuel pipe 309 and retrieving it to the fuel tank 4. Thus, there is no need to provide a pump or the like to retrieve the residual fuel.

In the invention described with reference to FIG. 7, the injection pump element 2 has the same configuration as the injection pump element shown in FIG. 3 and FIG. 4 as described in the foregoing first embodiment. More specifically, the injection pump element 2 has a gap 20a formed in the sliding contact surface of the plunger barrel 25 receiving the plunger 26 with the plunger 26, as shown in FIG. 4(b). The gap 20a is adapted to reduce in pressure and vaporize DME fuel in a liquid state leaked between the sliding contact surfaces of the plunger 26 and the plunger barrel 25 from the fuel gallery 11 toward the cam chamber 12, before flowing into the cam chamber 12.

The gap 20a may be formed by the annular groove 20 formed circumferentially in the inner peripheral surface of the plunger barrel 25, as shown in FIG. 5. It may also be formed by the annular groove 20 as "DME fuel vaporizing portion" formed circumferentially in the peripheral surface of the plunger 26, as shown in FIG. 6. A plurality of annular grooves 20 can be formed, and the gap 20a may be formed in the sliding contact surface of the plunger barrel 25 with the plunger 26 on the cam chamber 12 side.

It should be understood that the invention of the present application is not limited to the above embodiments and that various changes and modifications may be made within the scope of the invention described in the scope of the appended claims and those are also included in the scope of the invention of the present application.

INDUSTRIAL APPLICABILITY

According to the invention, reduced lubricating performance of lubricating oil caused by DME fuel in a liquid state mixed with the lubricating oil in a cam chamber can be prevented.

The invention claimed is:

1. A DME fuel supply device for a diesel engine, comprising:
an injection pump for delivering DME fuel supplied from a fuel tank via a feed pipe in a specified amount to an injection pipe in communication with a fuel injection nozzle of a diesel engine at specified timing;
an oil separator for separating DME fuel mixed with lubricating oil in a cam chamber of the injection pump from the lubricating oil;
a communication passage adapted to retrieve DME fuel separated by the oil separator to said fuel tank;
suction means disposed in the communication passage for pumping a vapor phase part in said cam chamber via said oil separator;

cam chamber pressure regulating means disposed between said suction means disposed in said communication passage and said oil separator for maintaining the pressure in said cam chamber at a specified pressure or above;

a bypass passage routed around the cam chamber pressure regulating means and directly communicating said cam chamber and said suction means; and bypass passage opening means for opening the bypass passage.

2. The DME fuel supply device for a diesel engine according to claim 1, further comprising:

cam chamber state detecting means for detecting at least one of the viscosity of lubricating oil in said cam chamber, the concentration of lubricating oil in said cam chamber, the pressure in said cain chamber, and the temperature in said cam chamber; and bypass controlling means for controlling said bypass passage opening means to be ON when the detection value detected by the cam chamber state detecting means exceeds a predetermined allowable value.

3. The DME fuel supply device for a diesel engine according to claim 2, wherein said bypass passage opening means is controlled to be OFF when the detection value detected by said cam chamber state detecting means achieves a predetermined allowable value or below.

4. The DME fuel supply device for a diesel engine according to claim 2 or 3, wherein said bypass controlling means controls said bypass passage opening means to be OFF when the detection value detected by said cam chamber state detecting means exceeds a predetermined allowable value and then a specified period of time elapses.

5. The DME fuel supply device for a diesel engine according to claim 1 or 2, further comprising regular intervals bypass controlling means for controlling said bypass passage opening means to be ON and OFF for a specified period of time at predetermined intervals.

6. The DME fuel supply device for a diesel engine according to claim 1 or 2, wherein said injection pump has an injection pump element for pressurizing and delivering said DME fuel in a fuel gallery supplied via said feed pipe from said fuel tank in a specified amount to an injection pipe in communication with a fuel injection nozzle of a diesel engine at specified timing through a delivery valve which can be opened and closed by up-and-down movement of a plunger in engagement with a camshaft rotated by rotation transmitted from a driving shaft of said diesel engine, the injection pump element having a DME fuel vaporizing portion with a gap formed in the sliding contact surface of a plunger barrel receiving said plunger with the plunger and adapted to reduce in pressure and vaporize said DME fuel in a liquid state leaked between the sliding contact surfaces of said plunger and said plunger barrel from said fuel gallery and the top of said plunger toward said cam chamber, before flowing into said cam chamber.

7. The DME fuel supply device for a diesel engine according to claim 6, wherein said gap of said injection pump is formed by an annular groove formed circumferentially in the peripheral surface of said plunger.

8. The DME fuel supply device for a diesel engine according to claim 6, wherein said gap of said injection pump is formed by an annular groove formed circumferentially in the inner peripheral surface of said plunger barrel.

9. The DME fuel supply device for a diesel engine according to claim 7, wherein said DME fuel vaporizing portion of said injection pump has a plurality of annular grooves.

10. The DME fuel supply device for a diesel engine according to claim 6, wherein said DME fuel vaporizing portion of said injection pump has said gap formed in the sliding contact surface of said plunger barrel with.said plunger on the side of said cam chamber.

11. The DME fuel supply device for a diesel engine according to claim 1 or 2, having a configuration such that said DME fuel delivered from said injection pump is supplied to a common rail, from which said DME fuel is delivered to the fuel injection nozzle.

12. An injection pump of the DME fuel supply device for a diesel engine, having an injection pump element for pressurizing and delivering said DME fuel in a fuel gallery supplied via a feed pipe from a fuel tank in a specified amount to an injection pipe in communication with a fuel injection nozzle of a diesel engine at specified timing through a delivery valve which can be opened and closed by up-and-down movement of a plunger in engagement with a camshaft rotated by rotation transmitted from a driving shaft of said diesel engine, said injection pump element having a DME fuel vaporizing portion with a gap formed in the sliding contact surface of a plunger barrel receiving said plunger with the plunger and adapted to reduce in pressure and vaporize said DME fuel in a liquid state leaked between the sliding contact surfaces of said plunger and said plunger barrel from said fuel gallery toward a cam chamber, before flowing into said cam chamber.

13. The injection pump according to claim 12, wherein said gap is formed by an annular groove formed circumferentially in the peripheral surface of said plunger.

14. The injection pump according to claim 12, wherein said gap is formed by an annular groove fanned circumferentially in the inner peripheral surface of said plunger barrel.

15. The injection pump according to claim 13 or 14, wherein said DME fuel vaporizing portion has a plurality of said annular grooves.

16. The injection pump according to claim 12 or 13, wherein said DME fuel vaporizing portion has said gap formed in the sliding contact surface of said plunger barrel with said plunger on the side of said cam chamber.

17. The DME fuel supply device for a diesel engine provided with the injection pump according to claim 12 or 13.

* * * * *